(12) United States Patent
Kazmi et al.

(10) Patent No.: US 8,761,770 B2
(45) Date of Patent: Jun. 24, 2014

(54) METHODS AND ARRANGEMENTS IN A TELECOMMUNICATION SYSTEM

(75) Inventors: Muhammad Kazmi, Bromma (SE); Christian Bergljung, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 621 days.

(21) Appl. No.: 12/679,458

(22) PCT Filed: Apr. 29, 2008

(86) PCT No.: PCT/SE2008/050493
§ 371 (c)(1), (2), (4) Date: Mar. 22, 2010

(87) PCT Pub. No.: WO2009/048405
PCT Pub. Date: Apr. 16, 2009

(65) Prior Publication Data
US 2010/0216473 A1    Aug. 26, 2010

Related U.S. Application Data

(60) Provisional application No. 60/978,490, filed on Oct. 9, 2007.

(51) Int. Cl.
*H04W 36/00* (2009.01)

(52) U.S. Cl.
USPC ............ 455/436; 455/442; 455/443; 370/331

(58) Field of Classification Search
CPC ..... H04W 36/16; H04W 36/18; H04W 36/20; H04W 36/22; H04W 36/24; H04W 36/30; H04W 36/32; H04W 36/0011; H04W 36/0016; H04W 80/04
USPC .................................. 455/436–444; 370/331
See application file for complete search history.

(56) References Cited

U.S. PATENT DOCUMENTS

| 6,278,879 B1 | 8/2001 | Western et al. |
| 2008/0039083 A1* | 2/2008 | Muniere et al. ............... 455/434 |

(Continued)

FOREIGN PATENT DOCUMENTS

| WO | 2008040447 A1 | 4/2008 |
| WO | 2008040448 A1 | 4/2008 |

OTHER PUBLICATIONS

International Search Report for PCT/SE2008/050493 mailed Mar. 9, 2009.

(Continued)

*Primary Examiner* — Wayne Cai
(74) *Attorney, Agent, or Firm* — Patent Portfolio Builders PLLC

(57) ABSTRACT

The present invention relates to exchanging a cell-specific parameter such as the A-MPR, comprising information related to a required additional maximum power reduction of a UE transmitter between networks nodes. The networks nodes may be radio base stations or other network nodes such as radio network controllers or core network nodes exemplified by access gateways (aGWs). By exchanging this cell-specific parameter with information of the required additional maximum power reduction between the network nodes, the cell-specific parameter is provided to the radio base station of the serving cell which implies that the serving cell can send the cell-specific parameter of the target cell to the UE prior to the handover from the serving cell to the target cell. This result in that the UE can start transmission to the target cell with the correct cell-specific parameter and the out-of-band emission requirements can be fulfilled in the target cell.

37 Claims, 4 Drawing Sheets

(56) References Cited

U.S. PATENT DOCUMENTS

2008/0043672 A1* 2/2008 Sebire et al. ............... 370/331
2009/0047962 A1* 2/2009 Rao .............................. 455/437

OTHER PUBLICATIONS

International Preliminary Report on Patentability for PCT/SE2008/050493 dated Sep. 1, 2009.
3GPP TR 25.813 V7.0.0 (Jun. 2006); "3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7)," Jun. 2006, pp. 1-39.
3GPP TSG-RAN WG Meeting #56, R2-063227, "Idle Gaps for Handover Measurements in E-UTRAN", Ericsson, Nov. 6-10, 2006, pp. 1-6.
3GPP TSG RAN WG1 Meeting #47, R1-063077, "E-UTRA Physical Layer Measurements," Motorola, Nov. 6-10, 2006, pp. 1-3.
3GPP TSG RAN WG1 Meeting #47bis, R1-070044, "E-UTRA Measurements Related to Mobility," Jan. 15-19, 2007, pp. 1-4.
Extended European Search Report in corresponding European Patent Application No. EP 08 77 9294 dated Mar. 5, 2014.
Motorola; "E-UTRA UE RF Spectrum emissions"; 3GPP TSG RAN WG4 (Radio) Meeting #44; R4-0701235; 3rd Generation Partnership Project; XP050177696; Aug. 20-24, 2007; pp. 1-17; Athens, GREECE.

* cited by examiner

METHODS AND ARRANGEMENTS IN A TELECOMMUNICATION SYSTEM

TECHNICAL FIELD

The present invention relates to methods and arrangements in a telecommunication system, in particular to methods and arrangements for providing A-MPR related information in connection with handover in wireless telecommunication systems.

BACKGROUND

The Universal Mobile Telecommunication System (UMTS) Terrestrial Radio Access Network (UTRAN) is a radio network of a UMTS system which is one of the third-generation (3G) mobile communication technologies, which was designed to succeed GSM. UTRAN uses W-CDMA as the underlying radio interface.

Evolved UMTS Terrestrial Radio Access Network (E-UTRA), also referred to as LTE (Long Term Evolution is standardized by 3GPP Long Term Evolution (LTE) which is a project within the $3^{rd}$ Generation Partnership Project (3GPP) to improve the Universal Mobile Telecommunication System (UMTS) standard with High Speed Packet Access functionality to cope with future requirements in terms of improved services such as higher data rates, improved efficiency, lowered costs etc.

An E-UTRAN typically comprises user equipments (UE) 150 wirelessly connected to radio base stations 130a-c as illustrated in FIG. 1a. In the E-UTRA, the radio base stations 130a-c are directly connected to the core network (CN) 100 e.g. via an aGW by means of the S1 interface 110. In addition, the radio base stations are also connected to each other vi the X2 interface 120. In contrast, in a UTRA network the radio base stations 130a-b are connected to the CN 100 via Radio Network Controllers 105, wherein each RNC 105 controls the connected radio base stations 130a-b. The radio base stations 130a-b are connected to the RNC 105 via an Iub interface 106 and the radio network controllers are connected to each other via an Iur interface 107 as illustrated in FIG. 1b. The radio base stations are usually referred to as NodeB in UTRAN and to eNodeB in E-UTRAN.

In E-UTRAN Orthogonal Frequency Division Multiple Access (OFDMA) technology is used in the downlink and single carrier frequency division multiple access (SC-FDMA) in the uplink. In both uplink and downlink the data transmission is split into several sub-streams, where each sub-stream is modulated on a separate sub-carrier. In OFDMA-based systems the available bandwidth is sub-divided into several physical resource blocks (RB) as defined, for example, in 3GPP TR 25.814: "Physical Layer Aspects for Evolved UTRA". In this specification a resource block is defined in both the time and the frequency domain. According to the current assumptions, the size of a resource block is 180 KHz and 0.5 ms in frequency and time domains, respectively. The overall uplink and downlink transmission bandwidth can be as large as 20 MHz.

Accordingly, E-UTRA networks may be deployed over a wide range of bandwidths, e.g. 1.4, 3, 5, 10, 15, 20 MHz, etc. As an example, a 10 MHz bandwidth would contain 50 resource blocks. For data transmission the network can allocate variable number of resource blocks to the UE both in the uplink (UL) and the downlink (DL). This allows more flexible use of channel bandwidth since the resource blocks are allocated according to the amount of data to be transmitted, the current radio conditions, UE capability, scheduling scheme etc.

Another important consideration is that even for the same radio base station, also referred to as eNodeB, multiple cells served by this radio base station may be allocated different bandwidths. The most typical case is where all eNode B operate with the same bandwidth on the same carrier frequency. But additionally, different eNodeBs may have different bandwidths even on the same carrier, e.g. 10 MHz cells in one set of eNodeBs and 15 MHz cells in another set of Node Bs. In this arrangement the most typical scenario is where a group of contiguous eNode B operates on certain bandwidth (e.g. 10 MHz) whereas another group of contiguous eNode B operates on another bandwidth (e.g. 5 MHz) Thus, at least adjacent eNodeBs in the border areas of these groups will be operating on different bandwidths.

The UE as well as the radio base station have to fulfill a certain number of out-of-band (OOB) emission requirements set by the regulatory bodies, e.g. ITU-R, FCC, ARIB, ETSI etc. Therefore out-of-band emission requirements are also referred to as regulatory radio requirements. The objective of the out-of-band requirements is to limit the interference caused by the transmitter (of the UE or the radio base station) outside its operating bandwidth up to adjacent carriers. The out-of-band requirements are specified in the 3GPP specifications TS25.101 and 3GPP TS25.104 for UTRA and in the 3GPP specifications TS36.101 and 3GPP TS36.104 for E-UTRA. The out-of-band requirements typically comprises: adjacent channel leakage ratio (ACLR), spectrum emission mask (SEM) and spurious emissions. It should be noted that the specific definitions of theses requirements can vary from one system to another. Furthermore, the out-of-band emission requirements have to be fulfilled on a slot basis in UTRA and on a sub-frame basis in E-UTRA.

In order to fulfill the out-of-band emission requirements, the concept of maximum power reduction (MPR) is introduced. Both the UE and the radio base station have to fulfill the out-of-band emission requirements irrespective of their transmission power level. In cases when the UE needs conserving its battery power the efficiency of the power amplifier (PA) is very critical. Therefore an efficient PA will be typically designed for certain typical operating points or configurations such that the PA operates in the linear zone. This implies a selection of e.g. modulation type, number of active RB (in case of E-UTRA), number of code channels/spreading factor (in case of UTRA). However, the UE may have to transmit using any combination of modulation, resource blocks etc. Therefore, in some UL transmission scenarios the UE power amplifier may not be able to operate in the linear zone, thereby causing out-of-band emissions due to harmonics. To ensure that the UE fulfils the out-of-band requirements for all allowed UL transmission configurations, the UE is allowed to reduce its maximum UL transmission power in some scenarios when it reaches its maximum power. This is called maximum power reduction or may also be referred to as UE power back-off. For instance a UE with maximum transmit power of 24 dBm power class may reduce its maximum power from 24 dBm to 23 or 22 dBm depending upon the configuration.

Also the radio base station may have to perform MPR but the radio base station can afford to have a PA with larger operating range since its efficiency is less critical compared to that of UE.

The MPR values for different configurations are generally well specified in the standard. The UE uses these specified values to apply MPR when the conditions for the corresponding configurations are fulfilled. These MPR values are regarded as static in a sense that they are independent of resource block allocation and other deployment aspects.

In the UTRAN the MPR requirements for the UEs are specified in release 5 of the 3GPP-specification 3GPP TS25.101 for configurations involving HS-DPCCH (High Speed Dedicated Physical Control Channel) transmissions. Similarly, the MPR is also specified for configurations using the enhanced Dedicated Channel (E-DCH) with and without 16 QAM modulations. In the UTRAN the maximum MPR can be as high as up to 3 dB or even more. However, the actual value depends upon a particular uplink transmission configuration including coding, spreading factor, modulations, physical channels and their gain factors etc). In E-UTRA, the MPR requirements for the UE are specified in 3GPP TS 36.101. In TS 36.101, the MPR depends upon factors such as bandwidth, modulation etc.

A further parameter denoted additional MPR (A-MPR) for E-UTRA is specified on top of the above described MPR parameter. A-MPR is not static as the MPR, i.e. the A-MPR may vary between different cells and between operating frequency bands as well as between cells belonging to different location areas. The A-MPR comprises all the remaining power reduction (on top of the above described MPR) needed to account for factors such as: bandwidth, frequency band, resource block allocation, and requirements set by regional regulatory bodies Federal Communications Commission (FCC), ARIB Association of Radio Industries and Businesses (ARIB).

Due to factors like variable bandwidth, varying number of resource block allocation, different frequency bands in different parts of the networks, etc., the A-MPR needs to be specified to fulfill the regulatory requirements that can vary from one eNodeB to another. Even if the deployment scenario in terms of used frequency bands, bandwidth size etc., is homogeneous in a large coverage area, there will always be border regions between these coverage areas. As the A-MPR is a cell specific value, the A-MPR is agreed to be signalled to the UE by including the A-MPR in the system information. System information is either sent on the broadcast channel for a UE in idle mode or on a UE specific channel (e.g. shared channel) for UE in connected mode. The system information includes all necessary information required by UE to access cell resources, perform handover, etc. The UE can therefore only acquire the A-MPR for a specific cell when it camps on that specific cell. The UE needs the A-MPR when it starts transmitting in the uplink to fulfill the out-of-band requirements.

When a UE is going to perform a handover from a serving cell to a target cell, the UE can only acquire system information of the serving cell. Therefore, the UE will not receive the A-MPR of the target cell which results in that the UE may not fulfill the out-of-band requirements when starting the uplink transmission in the target cell.

SUMMARY

The object of the present invention is to achieve a method and arrangement that makes it possible for the UE to fulfill out-of-band requirements when performing handover.

According to a first aspect of the present invention a method for a network node of a wireless communication network is provided. The network node is adapted to serve at least one cell and to wirelessly control at least one UE located in one of the at least one cell. In the method, a cell-specific parameter associated with a cell served by a further network node is received. The cell-specific parameter comprises information related to a required additional maximum power reduction of a transmitter of a UE controlled by said network node. Further, the received cell-specific parameter is transmitted to the UE which is controlled by said network node. Hence, the UE can use the cell-specific parameter when being handed over to the further network node.

According to a second aspect, a further method for a network node of a wireless communication network is provided. The network node is adapted to serve at least one cell and to wirelessly control at least one UE located in one of the at least one cell. In the method a cell-specific parameter associated with a cell served by the network node is transmitted to a further network node controlling a UE to be handed over to said network node. The cell-specific parameter comprises information related to a required additional maximum power reduction of a transmitter of the UE controlled by said network node. The further network node can now transmit the received cell-specific parameter to the UE controlled by the further network node and such that the UE can use the cell-specific parameter when being handed over to the network node.

According to a third aspect of the present invention a network node of a wireless communication network is provided. The network node is adapted to serve at least one cell and to wirelessly control at least one UE located in one of the at least one cell. The network node comprises means for receiving a cell-specific parameter associated with a cell served by a further network node. The cell-specific parameter comprises information related to a required additional maximum power reduction of a transmitter of a UE controlled by said network node. Furthermore, it comprises means for transmitting the received cell-specific parameter to the UE controlled by said network node. This implies that the UE can use the cell-specific parameter when being handed over to the further network node.

According to a fourth aspect of the present invention, a network node of a wireless communication network is provided. The network node is adapted to serve at least one cell and to wirelessly control at least one UE located in one of the at least one cell. The network node comprises means for transmitting a cell-specific parameter associated with a cell served by the network node to a further network node controlling a UE to be handed over to said network node. The cell-specific parameter comprises information related to a required additional maximum power reduction of a transmitter of a UE controlled by said further network node. The further network node can then transmit the received cell-specific parameter to the UE controlled by the further network node such that the UE can use the cell-specific parameter when being handed over to the further network node.

An advantage with embodiments of the present invention is that it ensures that a UE does not have to apply excessive A-MPR to meet the regulatory requirements.

A further advantage is that embodiments of the present invention improve handover access and reduce unnecessary out-of-band emissions at the handover.

A further advantage of embodiments of the present invention is that the UE does not have to read system information of the target cell in order to acquire the needed A-MPR in the target cell resulting in less UE complexity.

A yet further advantage is that embodiments of the present invention are applicable to self-organizing networks and the user deployments scenario where the node B installation is not static.

DESCRIPTION OF THE DRAWINGS

The invention will in the following be described in more detail with reference to enclosed drawings, wherein.

DETAILED DESCRIPTION

Figure 1A:
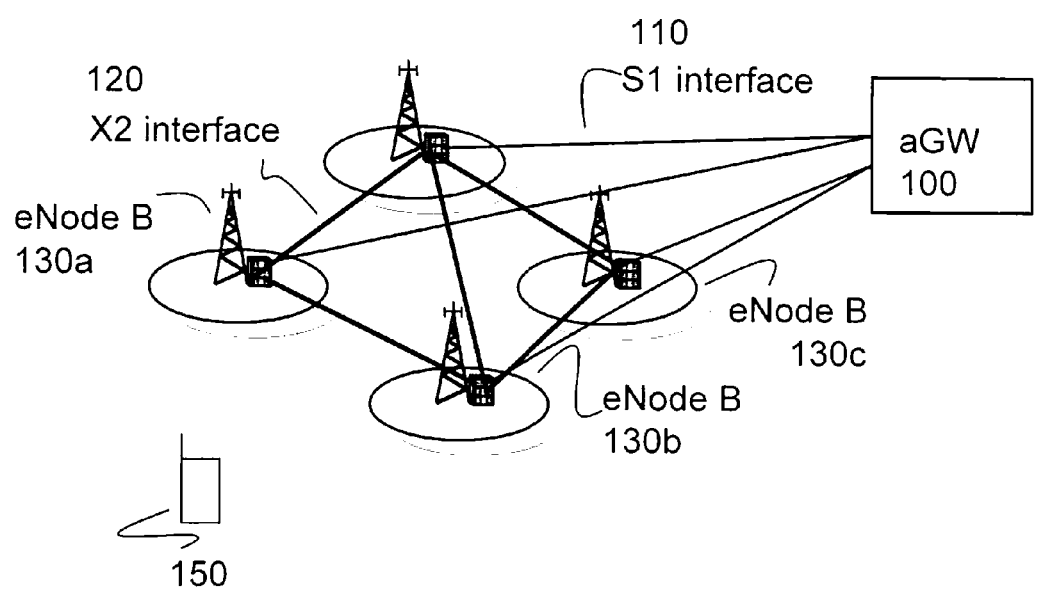
FIGS. 1a and 1b illustrate wireless communication networks wherein the present invention may be implemented.
Figure 1B:
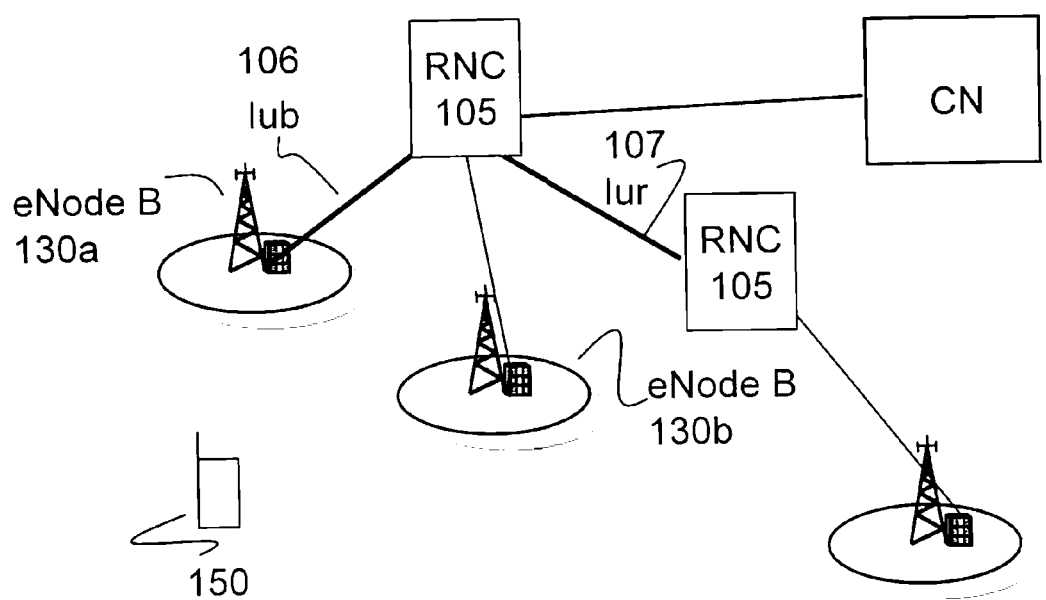

In the following description, for purposes of explanation and not limitation, specific details are set forth, such as particular sequences of steps, signalling protocols and device configurations in order to provide a thorough understanding of the present invention. It will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

When a UE controlled by the serving cell moves towards the cell border of the serving cell and experiences poor channel conditions, a handover towards a target cell will be triggered. The UE receives a handover command via the serving cell. The command will indicate to the UE the target cell, to which it should perform the handover. When the handover command is received, the UE starts transmission in the target cell. In order to ensure that the UE never defies the regulatory requirements it should use the correct value of A-MPR needed at the target cell from the beginning of the transmission in the target cell.

The idea of the present invention is to exchange a cell-specific parameter such as the A-MPR, comprising information related to a required additional maximum power reduction of a UE transmitter between networks nodes. The networks nodes may be radio base stations or other network nodes such as radio network controllers or core network nodes exemplified by access gateways (aGWs). By exchanging this cell-specific parameter with information of the required additional maximum power reduction between the network nodes, the cell-specific parameter is provided to the radio base station of the serving cell which implies that the serving cell can send the cell-specific parameter of the target cell to the UE prior to the handover from the serving cell to the target cell. This result in that the UE can start transmission to the target cell with the correct cell-specific parameter and the out-of-band emission requirements can be fulfilled in the target cell. The cell-specific parameter is also referred to as A-MPR related information and may be an A-MPR parameter.

Although the present invention is described with regard to an E-UTRA, the idea of exchanging cell-specific parameter with or related information is applicable to any other system where cell-specific information of the required additional maximum power reduction to be used by the UE when transmitting at the target cell is needed prior to the handover. For instance, in UTRA this type of information is according to an embodiment exchanged over interfaces such as Iub (between the Node B and RNC), and the Iur-interface (between RNCs) etc. Thus, the serving radio base station is configured to receive the cell-specific parameter from the target radio base station via a radio network controller.

Figure 2:
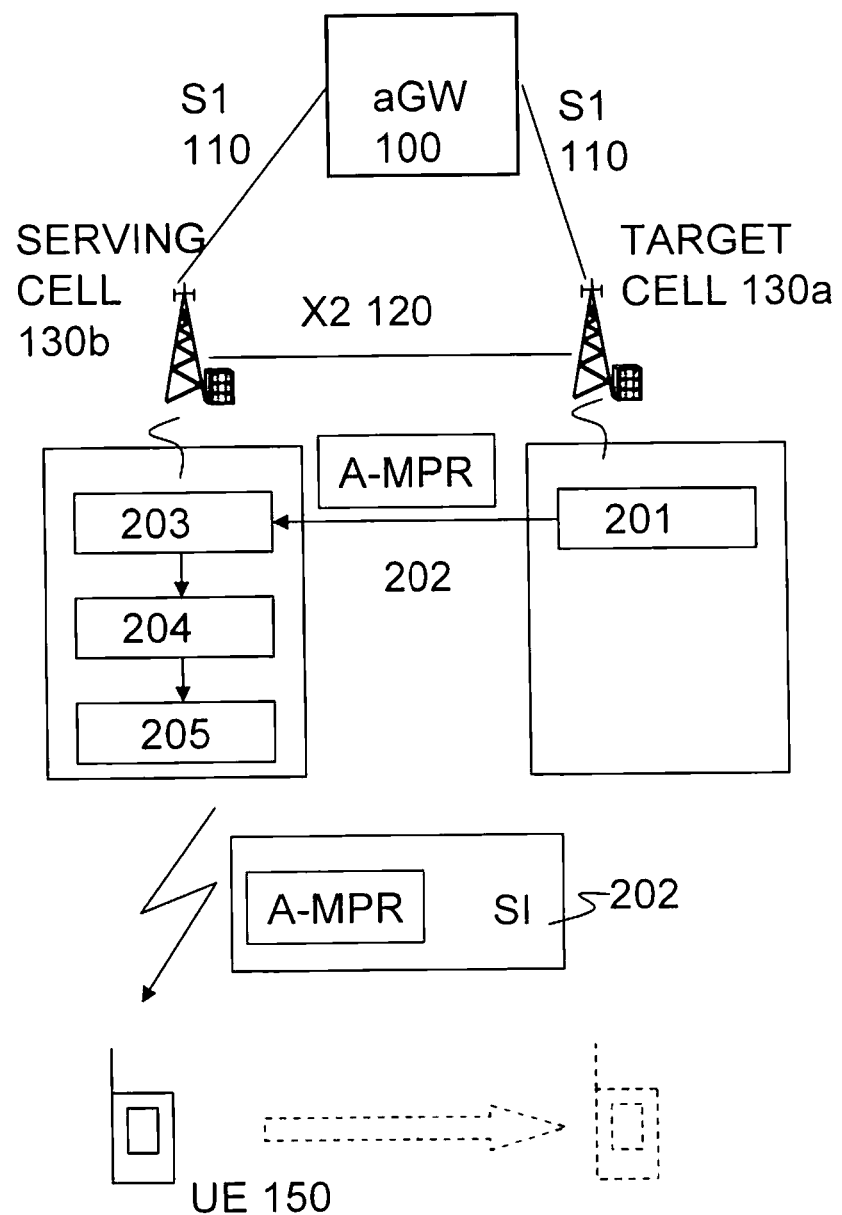
FIG. 2 illustrates arrangements according to embodiments of the present invention.

According to a first embodiment, the cell-specific parameter 202 with information of the required additional maximum power reduction is exchanged over the X2-interface 120. The X2-interface 120 is the interface between the radio base stations 130a, 130b as illustrated in FIG. 2. I.e., the radio base station 130b of the serving cell receives the cell-specific parameter 202 of the target cell over the X2-interface 120 from the target cell 130a. Accordingly, the radio base station 130b of the serving cell is configured 203 to receive the cell-specific parameter 202 and configured 204 to include it in system information. Furthermore, the radio base station 130b is configured 205 to send it to a UE 150 which will perform a handover (denoted by the arrow) to the target cell 130a. Each radio base station is aware of the required additional maximum power reduction of the cells that the respective radio base station serves, which results in that each base station of the present invention is configured to send 201 the cell-specific parameter to another radio base station. Furthermore, the serving radio base station is configured to provide 205 the cell-specific parameter of the target cell prior to handover to the UE.

According to a second embodiment, the cell-specific parameter 202 with information of the required additional maximum power reduction is exchanged over the S1-interface 110. I.e., the radio base station 130b of the serving cell receives the cell-specific parameter 202 of the target cell from the target cell 130a via a core network node 100, e.g. the aGW over the S1-interface 110 from the target cell 130a. This solution is particularly useful when base stations cannot directly communicate with each over the X2 interface for instance in some border areas, where base stations are connected to different AWG. Another such scenario includes base stations at the country borders but operated by the same service provider.

When there is a coverage area with uniform radio base stations in terms of their required additional maximum power reduction such as the A-MPR requirements, the above described cell-specific parameter between adjacent inhomogeneous coverage areas may also be transmitted via aGWs using the S1 interface 110.

According to a third embodiment, the cell-specific parameter is transmitted over the Iur interface or the interface between network nodes, wherein the network nodes are radio network controllers (RNC) in UTRAN or access gateways 100 in E-UTRAN. The Iur interface connects different RNC and the IP backbone (not shown in FIG. 2) is used to connected different aGWs. Hence, the A-MPR may then also be exchanged between different access gateways to be sent across their respective radio base stations.

In the following, both the first, the second and the third embodiments are further discussed. According to one alternative the cell-specific parameter is received transparently by the network node receiving the cell-specific parameter with information of the required additional maximum power reduction. According to a further alternative the cell-specific parameter is received by means of a background process by the network node receiving the cell-specific parameter.

If the maximum power reduction is unchanged since the last time the target cell reported the cell-specific parameter, the cell-specific parameter may be represented by flag bits. When the cell-specific parameter is sent between the network nodes, the parameter be transmitted together with handover related parameters such as transport format of random access channel to be used in target cell, power control related parameters etc. Further, when the cell-specific parameter associated with the target radio base station is sent by the serving radio base station to the UE, the parameter may be included in system information. I.e. the radio base station comprises means for including the cell-specific parameter into the system information.

Even if cell-specific values of the required additional maximum power reduction exemplified by the A-MPR values are different in different neighbor radio base stations, they can still be static or changed very infrequently. However, even in this type of static or semi-static A-MPR scenario it would be advantageous that these A-MPR values are exchanged over the interfaces such as the X2 or/and the S1-interface to prevent the need for any manual configuration in case operator modifies, downgrade or upgrade its network. This is in some sense part of the self organizing network (SON) concept and the user-deployment scenario. In case the A-MPR values are dynamic, e.g. due to variable resource block allocations for any other reason, the A-MPR needs to be exchanged over the X2 or over any other required network interface more often.

Hence methods for network nodes of a wireless communication network, wherein a first network node is adapted to serve at least one cell and to wirelessly control at least one User Equipment, UE, located in the at least one cell and wherein the UE is to be handed over to a second cell.

Figure 3A:
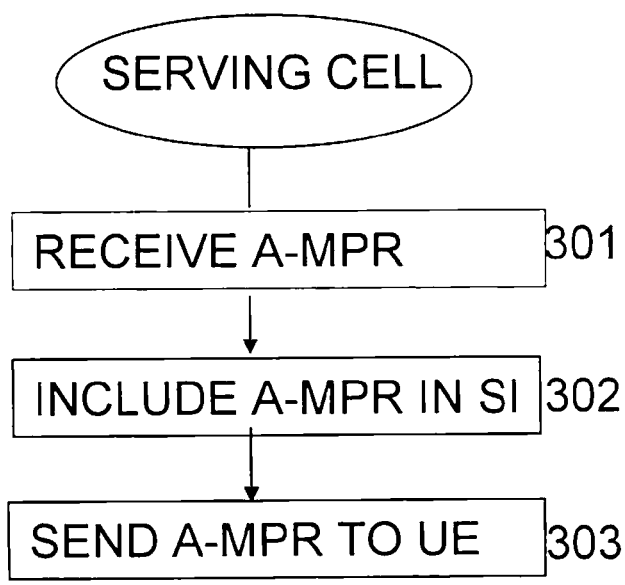
FIGS. 3a and 3b illustrate a flowchart of methods according to embodiments of the present invention.

A method for the first network node of the serving cell as illustrated by the flowchart of FIG. 3a comprises according to an embodiment the steps of:

301. Receive A-MPR related information associated with a cell served by a second network node, wherein the A-MPR related information comprises information related to a required additional maximum power reduction of a transmitter of the UE controlled by the first network node.

302. Include the A-MPR related information in system information.

303. Transmit the A-MPR related information included in the system information to the UE controlled by said network node such that the UE can use the cell-specific parameter when being handed over to the second network node.

Figure 3B:
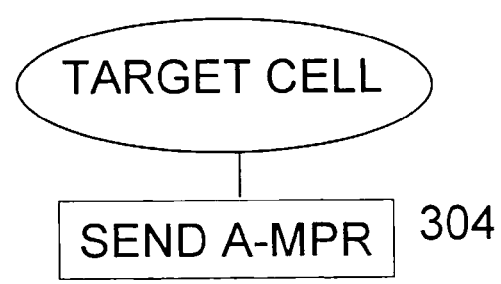

A method for the second network node of the target cell comprises as illustrated in FIG. 3b according to an embodiment the step of:

304. Transmit A-MPR related information to the first network node controlling a UE to be handed over to said network node, wherein the A-MPR related information comprises information related to a required additional maximum power reduction of a transmitter of a UE controlled by said network node, such that the first network node can transmit the received cell-specific parameter to the UE controlled by the further network node and that the UE can use the cell-specific parameter when being handed over to the first network node.

It should be noted that a radio base station should be configured to act as both the first and the second network nodes, which means that a radio base station should be configured to perform all the steps of 301-304 according to one embodiment.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method for a network node of a wireless communication network, wherein the network node is adapted to serve at least one cell and to wirelessly control at least one User Equipment, UE, located in one of the at least one cell, comprising the steps of:
    receiving, prior to handover of a UE from the network node to a further network node, a cell-specific parameter associated with a cell served by the further network node, the cell-specific parameter comprises information related to a required additional maximum power reduction of a transmitter of the UE controlled by said network node such that the required additional maximum power reduction of the transmitter of the UE controlled by said network node allows for the UE to meet an out of band emission requirement at handover, and
    transmitting, prior to handover of the UE from the network node to the further network node, the received cell-specific parameter to the UE controlled by said network node such that the UE can use the cell-specific parameter when being handed over to the further network node.

2. The method according to claim 1, wherein the cell-specific parameter is received transparently by the network node.

3. The method according to claim 1, wherein the cell-specific parameter is received by a background process.

4. The method according to claim 1, wherein the cell-specific parameter is represented by flag bits if the additional maximum power reduction is unchanged compared to that of the said serving cell.

5. The method according to claim 1, wherein the network node is a radio base station.

6. The method according to claim 5, wherein it comprises the further step of:
    including the received cell-specific parameter in system information when transmitting the cell-specific parameter to the UE.

7. The method according to claim 1, wherein the further network node is a radio base station.

8. The method according to claim 7, wherein the cell-specific parameter is received from a further radio base station over an X2 interface.

9. The method according to claim 7, wherein the cell-specific parameter is received from the further network node via an access gateway.

10. The method according to claim 7, wherein the cell-specific parameter is received from the further network node via a radio network controller.

11. The method according to claim 10, wherein the cell-specific parameter is received over an Iur interface.

12. The method according to claim 10, wherein the cell-specific parameter is received over a S1 interface.

13. The method according to claim 1, wherein the first network node and the further network node are radio network controllers and the cell-specific parameter is received over an Iub interface and transmitted to the UE via a radio base station controlling the UE.

14. The method according to claim 1, wherein the first network node and the further network node are access gateways and the cell-specific parameter is received via backbone network connected said access gateways and transmitted to the UE via a radio base station controlling the UE.

15. A method for a network node of a wireless communication network, wherein the network node is adapted to serve at least one cell and to wirelessly control at least one User Equipment, UE, located in one of the at least one cell, comprising the step of:

transmitting, prior to handover of a UE from the network node to a further network node, a cell-specific parameter associated with a cell served by the network node to the further network node controlling the UE to be handed over to said network node, wherein the cell-specific parameter comprises information related to a required additional maximum power reduction of a transmitter of the UE controlled by said network node such that the required additional maximum power reduction of the transmitter of the UE controlled by said network node allows for the UE to meet an out of band emission requirement at handover, such that the further network node can transmit the received cell-specific parameter to the UE controlled by the further network node and that the UE can use the cell-specific parameter when being handed over to the network node.

16. The method according to claim 15, wherein the cell-specific parameter is transmitted together with handover related parameters.

17. The method according to claim 15, wherein the network node is a radio base station.

18. The method according to claim 15, wherein the further network node is a radio base station.

19. The method according to claim 18, wherein the cell-specific parameter is transmitted to the further radio base station over an X2 interface.

20. The method according to claim 15, wherein the network node is a gateway wherein the cell specific parameter is transmitted to the network node controlling the UE via a further gateway.

21. A network node of a wireless communication network, wherein the network node is adapted to serve at least one cell and to wirelessly control at least one User Equipment, UE, located in one of the at least one cell, comprising:
means for receiving a cell-specific parameter associated with a cell served by a further network node, the cell-specific parameter comprises information related to a required additional maximum power reduction of a transmitter of a UE controlled by said network node prior to handover of the UE from the network node to the further network node such that the required additional maximum power reduction of the transmitter of the UE controlled by said network node allows for the UE to meet an out of band emission requirement at handover, and
means for transmitting the received cell-specific parameter to the UE controlled by said network node such that the UE can use the cell-specific parameter when being handed over to the further network node prior to handover of the UE from the network node to the further network node.

22. The network node according to claim 21, wherein the network node is a radio base station.

23. The network node according to claim 22, wherein it comprises means for including the received cell-specific parameter in system information when transmitting the cell-specific parameter to the UE.

24. The network node according to claim 21, wherein the further network node is a radio base station.

25. The network node according to claim 24, wherein the cell-specific parameter is received from a further radio base station over an X2 interface.

26. The network node according to claim 24, wherein the cell-specific parameter is received from the further network node via an access gateway.

27. The network node according to claim 26, wherein the cell-specific parameter is received over a S1 interface.

28. The network node according to claim 24, wherein the cell-specific parameter is received from the further network node via a radio network controller.

29. The network node according to claim 28, wherein the cell-specific parameter is received over an Iur interface.

30. The network node according to claim 21, wherein the first network node and the further network node are radio network controllers and the cell-specific parameter is received over an Iub interface and transmitted to the UE via a radio base station controlling the UE.

31. The network node according to claim 21, wherein the first network node and the further network node are access gateways and the cell-specific parameter is received via backbone network connected said access gateways and transmitted to the UE via a radio base station controlling the UE.

32. A network node of a wireless communication network, wherein the network node is adapted to serve at least one cell and to wirelessly control at least one User Equipment, UE, located in one of the at least one cell, comprising:
means for transmitting, prior to handover of a UE from the network node to a further network node, a cell-specific parameter associated with a cell served by the network node to the further network node controlling the UE to be handed over to said network node, wherein the cell-specific parameter comprises information related to a required additional maximum power reduction of a transmitter of a UE controlled by said further network node such that the required additional maximum power reduction of the transmitter of the UE controlled by said network node allows for the UE to meet an out of band emission requirement at handover, and such that the further network node can transmit the received cell-specific parameter to the UE controlled by the further network node and that the UE can use the cell-specific parameter when being handed over to the further network node.

33. The network node according to claim 32, wherein the cell-specific parameter is transmitted together with handover related parameters.

34. The network node according to claim 32, wherein the network node is a radio base station.

35. The network node according to claim 32, wherein the further network node is a radio base station.

36. The network node according to claim 35, wherein the cell-specific parameter is transmitted to the further radio base station over an X2 interface.

37. The network node according to claim 32, wherein the network node is a gateway wherein the cell specific parameter is transmitted to the network node controlling the UE via a further gateway.

* * * * *